United States Patent
Scarborough

(10) Patent No.: US 6,196,758 B1
(45) Date of Patent: Mar. 6, 2001

(54) TOOL HAVING AN ACCESSORY RECEIVER

(76) Inventor: Dane Scarborough, P.O. Box 3351, Hailey, ID (US) 83333

(*) Notice: Subject to any disclaimer, the term of this patent is extended or adjusted under 35 U.S.C. 154(b) by 0 days.

(21) Appl. No.: 09/280,271

(22) Filed: Mar. 29, 1999

Related U.S. Application Data

(60) Provisional application No. 60/073,197, filed on Mar. 30, 1998.

(51) Int. Cl.$^7$ ........................................ F16B 3/00
(52) U.S. Cl. .................. 403/353; 403/379.2; 403/109.3; 403/315
(58) Field of Search ............................. 403/109.2, 109.3, 403/109.6, 315, 316, 353, 379.3, 379.2, 348, 350

(56) References Cited

U.S. PATENT DOCUMENTS

| | | | |
|---|---|---|---|
| 808,862 | * | 1/1906 | McCain . |
| 935,807 | * | 10/1909 | Oswald . |
| 1,012,668 | * | 12/1911 | Lofberg . |
| 1,231,120 | * | 6/1917 | Brasseur . |
| 1,298,024 | * | 3/1919 | Ellison . |
| 2,487,245 | * | 11/1949 | Hubbard . |
| 4,455,723 | * | 6/1984 | Umetsu ................................ 403/353 |
| 4,774,767 | * | 10/1988 | Scheyer . |
| 4,860,459 | * | 8/1989 | Dengler ................................ 33/379 |
| 5,062,213 | * | 11/1991 | Kolesky ................................ 33/479 |
| 5,716,154 | * | 2/1998 | Miller et al. ......................... 403/353 |

FOREIGN PATENT DOCUMENTS

872653 * 6/1942 (FR) .

* cited by examiner

Primary Examiner—Lynne H. Browne
Assistant Examiner—Tomlyne A. Malcolm
(74) Attorney, Agent, or Firm—Gene Scott-Patent Law & Venture Group

(57) ABSTRACT

An accessory receiver is adapted for mechanical engagement with a level sensing device such as a carpenter's level or with other similar tools. The accessory receiver provides a receiver body for engagement within a box frame structure by spring action so that surfaces of the receiver and the level are forced into intimate contact. A pair of springs forces a receiver body into a flush position on the face of a box frame. A keyhole slot in the receiver is adapted for receiving a shaft for an accessory and for capturing it with snap-action onto an alignment upset for true alignment of the accessory with the tool.

10 Claims, 2 Drawing Sheets

TOOL HAVING AN ACCESSORY RECEIVER

This application claims the filing date of a previously filed provisional application having Ser. No. 60/073,197 and an assigned filing date of Mar. 30, 1998 and which contains subject matter identical to the present application.

BACKGROUND OF THE INVENTION

1. Field of the Invention

This invention relates generally to carpenter's levels and similar devices, and more particularly to a quick connect accessory mounting system for such a level, the system enabling the level to engage handles, mounting fixtures and other accessories when they are needed, and to disengage such devices quickly when necessary.

2. Description of Related Art

The following art defines the present state of this field:

Lemile, U.S. Pat. No. 676,330 describes improvements in the construction of spirit-levels, more especially the manner of mounting the level or glass or vial, and to enable the latter to be readily adjusted vertically from the exterior and to cushion the same.

James, U.S. Pat. No. 778,130 describes improvements in spirit levels, and the object is to provide an improved construction of spirit-level having simple and effective means for attaching the liquid-tube to the support and conveniently adjusting the same.

McCain, U.S. Pat. No. 808,862 relates to leveling and plumbing instruments, and it consists of a chambered bar provided with a pivoted spirit-level and a shaft and cam for adjusting the same to an extent indicated by a pointer on the shaft.

Oswald, U.S. Pat. No. 935,807 describes an improvement in the construction of spirit level attachments, and to provide a simple, inexpensive and efficient device of this character capable of ready adjustment to arrange the bubble tubes in proper position with relation to the instrument, and adapted to permit a bubble tube to be readily removed and replaced by a new tube, should the bubble tube be broken or otherwise impaired through rough handling of the instrument.

Lofberg, U.S. Pat. No. 1,012,668 describes improvements in levels and has for its object the provision of an improved level of simple construction and efficient operation.

Ellison, U.S. Pat. No. 1,298,024 describes a spirit level which may be easily and readily applied to or detached from a level-stock, so that bricklayers, masons, or other artisans who use such leveling instruments may carry the spirit level to and from their work and apply the same to any suitable level-stock.

Hubbard, U.S. Pat. No. 2,487,245 relates to a level of the type used by carpenters, bricklayers, and other workmen erecting buildings and other structures which must be kept perpendicularly and horizontally accurate. If such levels are not carefully handled the casings or rings holding bubble glasses are liable to move out of their proper positions and the level will not be accurate.

Scheyer, U.S. Pat. No. 4,774,767 describes a water level or spirit level having at least one water level member whose angular adjustment relative to the contact surface can be changed. The water level member is rotatably mounted on the level body or a structural part fixedly connected to the level body. The water level member is fixable in the desired angular position relative to the level body or the structural parts connected to the level body. The rotatable water level member has at least one circumferentially extending flange which engages under a clamping jaw. The clamping jaw can be pressed against the surface of the flange by means of a manually operated clamping member.

Dengler, U.S. Pat. No. 4,860,459 describes a bubble level with a hollow metal section that has a circular window, in which a cylindrical level tube for a vertical level can be inserted with a positive interlock in the axial direction and can be fastened with a material interlock. A level support is inserted into the hollow section in the axial direction. The support has a cylindrical seat aligned with the window, to receive a level holder that bears a level. An interlock device is disposed between the level support and the level holder. By means of this interlock device, the level holder is mounted axially fixed, but rotatable until it is fastened by the material interlock.

Bird et al, U.S. Pat. No. 4,999,921 describes an adjustable spirit level having a plurality of spirit levels therein. A first spirit level measures vertical orientation, a second adjustable spirit level is adjustable to a true horizontal position, and a third spirit level is adjustable to any desired position between vertical and horizontal. The second level may be adjusted with a rotatable cam-shaped end piece secured within the level body, while the third level is ratcheted to a predetermined angle. The third level may be held in place by a spring member biasing the level against the level body.

Tate, U.S. Pat. No. 5,111,589 describes an adjustable plumb level formed from an I beam with wood side panels. A circular hole is formed through the I beam and side panels, within which an indicating mechanism is disposed. The indicating mechanism is easily replaceable so that the present invention can be used as a plumb or a level.

Tate, U.S. Pat. No. 5,177,873 describes an adjustable plumb level having a first gear driven by a second gear. The second gear has a smaller external diameter than does said first gear. The second gear is operatively coupled to first gear so that when an external force causes the second gear to rotate, the first gear also rotates. The first gear includes a straight vial disposed in the center thereof.

The prior art teaches the use of levels with mechanical clamping devices for attachment to various surfaces. However, the prior art does not teach a level incorporating a quick connect/disconnect device for accessory attachments. The present invention fulfills these needs and provides further related advantages including the use of an accessory receiver adapted for general use with tools such as levels, squares and other devices.

SUMMARY OF THE INVENTION

The present invention teaches certain benefits in construction and use which give rise to the objectives described below.

The present invention provides an accessory receiver adapted for mechanical engagement with a level sensing device such as a carpenter's level or with other similar tools. The accessory receiver provides a receiver body for engagement within a box frame structure by spring action so that surfaces of the receiver and the level are forced into intimate contact. A pair of springs forces a receiver body into a flush position on the face of a box frame. A keyhole slot in the receiver is adapted for receiving a shaft for an accessory and for capturing it with snap-action.

A primary objective of the present invention is to provide an accessory receiver having advantages not taught by the prior art.

Another objective is to provide such an accessory receiver capable of accommodating a wide range of accessories with quick connect and disconnect action.

A further objective is to provide such an accessory receiver adapted for being engaged within a box beam style leveling tool and enabled for true alignment therewith.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
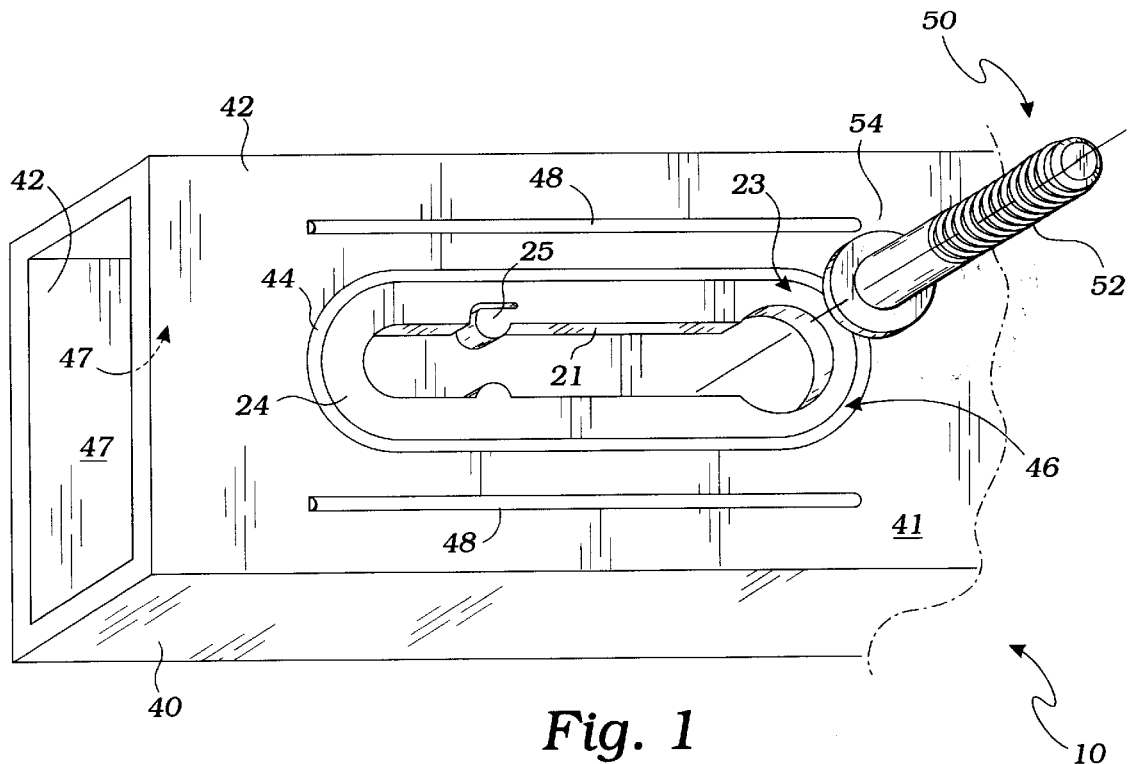
FIG. 1 is a perspective view of the invention showing a tool with an accessory receiver mounted and a threaded standoff for engagement into the receiver.
Figure 2:
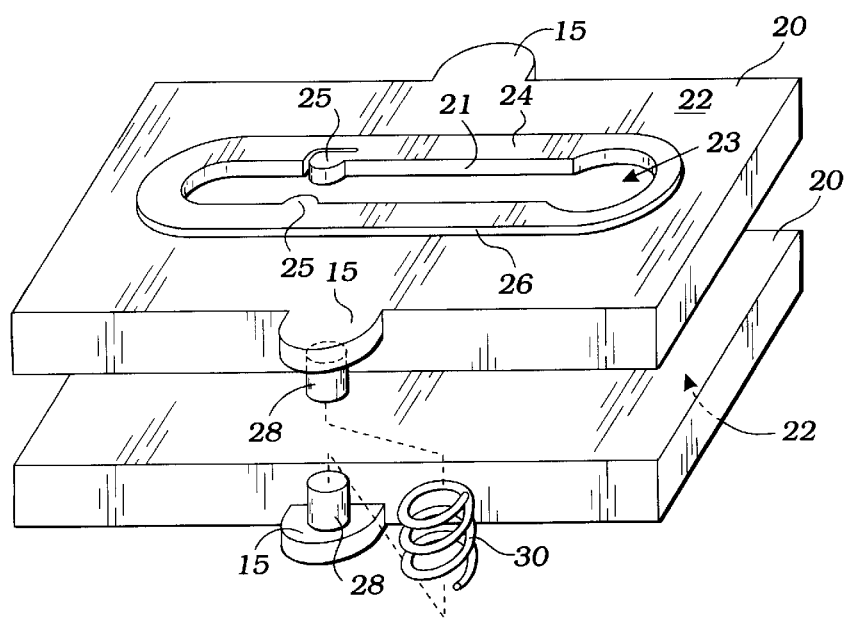
FIG. 2 is a perspective view of a pair of back-to-back receivers thereof as mounted into the tool; and a spring used between the receivers.

The above described drawing figures illustrate the invention, a tool with alignable accessory receiver apparatus 10 comprising a receiver plate 20 providing a planar receiver plate face surface 22 having a non-circular elongate boss 24 extending outwardly from the receiver plate face surface 22 for defining an elongate boss peripheral edge 26 therearound. The receiver plate 20 further provides an integral biasing means centering means 28 such as a pair of shafts mounted on ears 15 extending laterally from the receiver plate 20 and enabled for supporting a biasing means 30, such as a pair of coil springs, thereon. In FIG. 2, one coil spring 30 is visible in the foreground, the other is not visible, being hidden on the far side of the figure. The receiver plate 20 further provides an aperture rim 21 defining a keyhole shaped through clearance aperture 23 in the elongate boss 24, the keyhole shaped aperture 23 providing a snap-action shaft engagement means 25 such as a flexible undercut protrusion means as shown in FIGS. 1 and 2.

Figure 3:
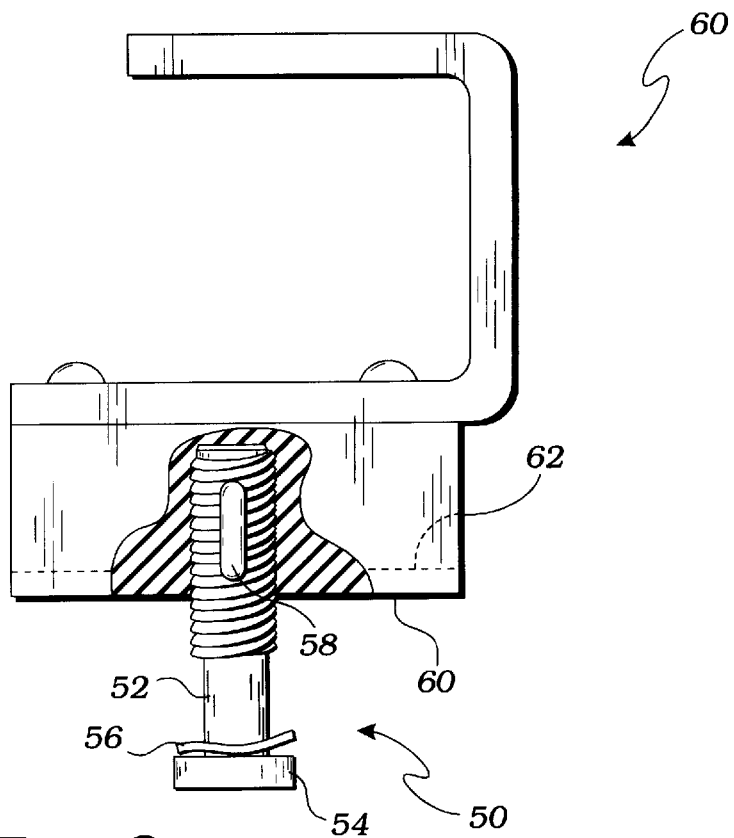
FIG. 3 is a side elevational view of a threaded standoff thereof as used with an accessory to be mounted onto the tool.

One or more of the receiver plates 20 are mounted in a tool 40, such as a carpenter's level, a T-square or a flat and true guide bar for a router or other utility apparatus. The tool 40, in one embodiment of the present invention as shown in FIG. 1, is preferably constructed from a rectangular cylinder so as to provide a pair of opposing and spaced apart tool walls 42. In this first embodiment, one of the spaced apart tool walls 42 provides a tool wall aperture rim 44 defining a tool wall aperture 46 of such size and shape as to accept the elongate boss 24 of the receiver plate 20 when the receiver plate face surface 22 abuts an interiorly facing surface 47 of the one of the spaced apart tool walls 42. In an alternate embodiment, two of the receiver plates 20 are mounted back-to-back using the same biasing means 30 as shown in FIG. 2. This positions the biasing means 30 between the pair of opposing ears 15 for removably holding the receiver plate(s) 20 in place within the tool 40. The spaced apart tool walls 42 provide an elongate linearly extending surface upset means 48 on an exteriorly facing surface 41 thereof. This upset means 48 is preferably a linear groove, or a linear boss, (as shown) extending into or protruding out of the surface 41 respectively for mating with a complimentary linear boss or complimentary linear groove 62 in an accessory mounting plate surface 64 drawn into contact with the tool 40 so as to provide and maintain accurate alignment of an accessory 60 with the tool. As shown in FIG. 3, the linear side-by-side grooves 62 are placed over the embossed linear upsets 48 shown in FIG. 1 for alignment of the accessory with the tool. It may be critical for aligning a laser pointer, for instance, with a bubble type level.

A threaded standoff 50 provides a shaft 52 terminated by a disk-shaped head 54, the disk-shaped head enabled by size for passage through the keyhole-shaped aperture 23, and the shaft 52 is enabled by size for lateral sliding engagement with the snap-action shaft engagement means 25 for locking engagement therein whereby accessories may be fixtured onto the tool 40 by providing a threaded hole for accepting the threaded standoff 50. Inventively, the receiver plate varies in thickness so that as the shaft 52 is moved laterally for engagement with the snap-action shaft engagement means 25 the receiver plate thickness increases thereby drawing the accessory into more intimate contact with the receiver plate 20 and the tool 40. To assure a tight attachment a biasing washer means 56 such as a wave washer may be fitted under the disk-shaped head 54, and to prevent loosening in the axial direction of the shaft 52. Further, the shaft 52 may be provided with a thread locking means 58 such as an elastomeric plug.

Figure 4:
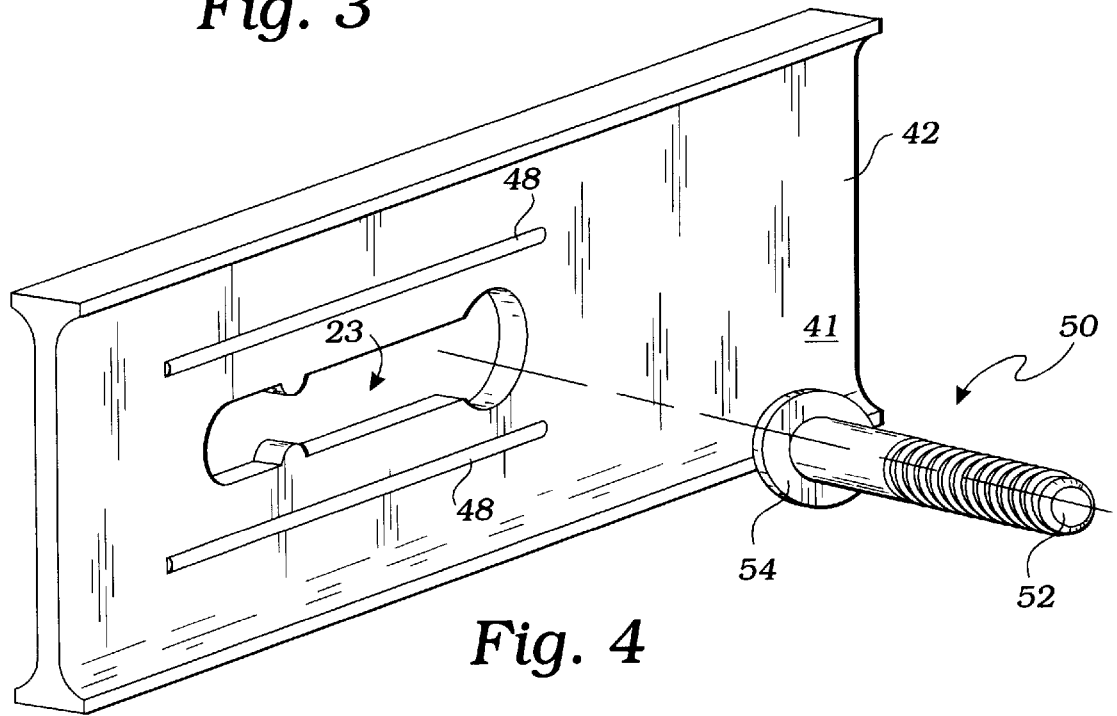
FIG. 4 is a further embodiment of the invention built into an I-beam.

In a further embodiment, shown in FIG. 4, the tool provides a tool single wall 42, the tool wall providing an elongate linearly extending surface upset means 48 on an exteriorly facing surface 41 thereof for alignment of an accessory 60 there against, and further providing a keyhole shaped aperture 23 providing a snap-action shaft engagement means 25 and a threaded standoff 50 providing a shaft 52 terminated by a head 54, the head enabled by size for passage through the keyhole-shaped aperture 23, the shaft 52 enabled by size for lateral sliding engagement with the snap-action shaft engagement means 25 for locking engagement therein whereby accessories may be fixtured onto the tool.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A tool with alignable accessory receiver apparatus comprising:

a receiver plate providing a planar receiver plate face surface having a non-circular elongate boss extending outwardly from the receiver plate face surface for defining an elongate boss peripheral edge therearound, and further providing an integral biasing means centering means enabled for supporting a biasing means thereon, the receiver plate further providing an aperture rim defining a keyhole shaped aperture in the elongate boss, the keyhole shaped aperture providing a snap-action shaft engagement means;

a tool constructed from a rectangular cylinder so as to provide a pair of opposing and spaced apart tool walls, a first one of the spaced apart tool walls providing a tool wall aperture rim defining a tool wall aperture of such size and shape as to accept the elongate boss of the receiver plate therein with the receiver plate face surface abutting an interiorly facing surface of the first one of the spaced apart tool walls, so as to position the biasing means between the pair of opposing tool walls for removably holding the receiver plate in place within the tool, the first one of the spaced apart tool walls providing an elongate linearly extending surface upset means on an exteriorly facing surface thereof;

a threaded standoff providing a shaft terminated by a disk-shaped head, the disk-shaped head enabled by size for passage through the keyhole-shaped aperture, the shaft enabled by size for lateral sliding engagement with the snap-action shaft engagement means for locking engagement therein whereby accessories may be fixtured onto the tool.

2. The apparatus of claim 1 wherein the receiver plate varies in thickness so that as the threaded shaft is moved for engagement with the snap-action shaft engagement means the receiver plate thickness increases.

3. The apparatus of claim 1 wherein the snap-action shaft engagement means provides a flexible undercut protrusion means.

4. The apparatus of claim 1 wherein the threaded standoff further provides a biasing washer means.

5. The apparatus of claim 1 wherein the threaded standoff further provides a thread locking means.

6. A tool with alignable accessory receiver apparatus comprising:

a pair of receiver plates, each of the receiver plates providing a planar receiver plate face surface having a non-circular elongate boss extending outwardly from the receiver plate face surface for defining an elongate boss peripheral edge therearound, and further providing an integral biasing means centering means enabled for supporting a biasing means thereon, the receiver plate further providing an aperture rim defining a keyhole shaped aperture in the elongate boss, the keyhole shaped aperture providing a snap-action shaft engagement means;

a tool constructed from a rectangular cylinder so as to provide a pair of opposing and spaced apart tool walls, each one of the spaced apart tool walls providing a tool wall aperture rim defining a tool wall aperture of such size and shape as to accept the elongate boss of one of the receiver plates therein with the receiver plate face surface thereof abutting an interiorly facing surface of the tool wall, so as to position the biasing means between the pair of opposing tool walls for removably holding the receiver plates in place within the tool, each one of the spaced apart tool walls providing an elongate linearly extending surface upset means on an exteriorly facing surface thereof;

a pair of treaded standoffs, each one of the standoffs providing a shaft terminated by a disk-shaped head, the disk-shaped head enabled by size for passage through either one of the keyhole-shaped apertures, the shaft enabled by size for lateral sliding engagement with the snap-action shaft engagement means for locking engagement therein whereby accessories may be fixtured onto the tool by engagement with either of the threaded standoffs and aligned by engagement with one of the linearly extending surface upset means.

7. The apparatus of claim 6 wherein the receiver plates each varies in thickness so that as one of the threaded shafts is moved for engagement with the snap-action shaft engagement means the receiver plate thickness increases.

8. The apparatus of claim 6 wherein each of the snap-action shaft engagement means provides a flexible undercut protrusion means.

9. The apparatus of claim 6 wherein each of the threaded standoffs further provide a biasing washer means.

10. The apparatus of claim 6 wherein each of the threaded standoffs further provide a thread locking means.

* * * * *